(12) United States Patent
Batterton

(10) Patent No.: US 6,279,510 B1
(45) Date of Patent: Aug. 28, 2001

(54) VETERINARY TREATMENT TABLE

(76) Inventor: Richard Batterton, 554 S. Allen St., Boyd, TX (US) 76023

( * ) Notice: Subject to any disclaimer, the term of this patent is extended or adjusted under 35 U.S.C. 154(b) by 0 days.

(21) Appl. No.: 09/560,112

(22) Filed: Apr. 28, 2000

(51) Int. Cl.[7] .............................. A01K 15/04; A47B 13/00
(52) U.S. Cl. ................................. 119/753; 5/606
(58) Field of Search .................... 119/165, 174, 119/603, 753, 754, 755, 756; 4/541.1, 541.3; 607/81, 85, 87; 5/600, 606

(56) References Cited

U.S. PATENT DOCUMENTS

| | | | |
|---|---|---|---|
| 1,900,255 | * 3/1933 | Ormsbee | 5/606 |
| 2,460,857 | 2/1949 | Sweat | 119/103 |
| 3,779,211 | * 12/1973 | Etes | 119/753 |
| 4,454,628 | 6/1984 | Olson | 17/44 |
| 4,650,171 | 3/1987 | Howorth | 269/322 |
| 4,819,925 | 4/1989 | Linnemann et al. | 269/327 |
| 4,843,690 | * 7/1989 | Iacobucci et al. | 5/606 |
| 5,488,926 | 2/1996 | Hunt | 119/756 |
| 5,794,570 | 8/1998 | Foster et al. | 119/756 |
| 5,826,286 | 10/1998 | Cranston | 5/606 |

* cited by examiner

*Primary Examiner*—Charles T. Jordan
*Assistant Examiner*—Elizabeth Shaw
(74) *Attorney, Agent, or Firm*—Bracewell & Patterson, LLP

(57) ABSTRACT

Disclosed is a veterinarian treatment table having a base upon which an elongated tub rests. The tub has an inclined bottom wall to drain fluids towards a drain at the bottom of the tub. Also provided is a fluid dispersing means which, in one embodiment, is a spray bar having a plurality of openings to allow fluid such as water to flow onto the tub bottom. A fluid sheeting element is also provided to form a uniform sheet of fluid from the fluid. The tub is fitted with a grate that will support an animal and allow fluids to flow freely from the animal to the tub interior space and bottom wall. The uniform sheet of fluid from the fluid dispersing means continuously washes fluids from the animal away and into a drain. The water flow can be adjusted by a valve controlled by the veterinarian practitioner.

17 Claims, 3 Drawing Sheets

VETERINARY TREATMENT TABLE

BACKGROUND OF THE INVENTION

1. Field of the Invention

The present invention relates in general to veterinarian treatment tables, and more particularly to a non-sterile treatment table having a continuously running sheet of fluid beneath a grate where the animal rests, the fluid washing away debris and fluids from treating the animal.

2. Description of the Prior Art

In treating animals, veterinarians often perform procedures that do not require a sterile environment, but do require a clean, hygienic surface. Such treatments may require the trimming or clipping of hair and nails, suturing wounds, shots, or other procedures. Further, during such treatments, the non-anesthetized animals often become nervous and may urinate. Thus, liquids and debris can quickly collect in the area where an animal such as a dog or cat is being treated. Further, to facilitate the practitioner in treating the animal, the animal is often placed upon a treatment table. Thus, liquids and debris will collect on this table and require cleaning after each treatment, and perhaps even during one procedure. This is often not possible, and in the least time consuming and disruptive.

Treatment tables that are currently used, such as those made by VSSI, Inc. (Carthage, Mo.), comprise a base cabinet and a simple tub having a grating to fit over the top where the animal rests. Fluids, etc. will fall through the grate and into the tub, where the practitioner may later remove the grate to clean the interior. The currently used treatment tables do not have a means for conveniently washing away material that falls into the tub. Foster et al. (U.S. Pat. No. 5,794,570) discloses a portable pet washing and grooming tub that has a tub with a drain where water and other material can be washed away. However, the Foster et al. tub is inappropriate for treating animals, as it does not provide a large area for an animal to lay. Hunt (U.S. Pat. No. 5,488,926) discloses a livestock table that allows for fluids and other materials to fall to the ground below. This would be inappropriate, however, for an indoor veterinarian treatment center or operating room environment where hygienic conditions are desirable.

There are other devices in the prior art that serve various other purposes. For example, Howorth (U.S. Pat. No. 5,650,171) discloses an autopsy table having a non-permeable table top and air ducts for continuously pushing air over the table to remove fumes that can be harmful. Olson (U.S. Pat. No. 4,454,628) discloses a fish cleaning table that can be attached to kitchen sink, the table having a tube with apertures for creating a flow of water underneath the fish as they are being cleaned. Also disclosed by Jeter (U.S. Pat. No. 2,222,767) is a table cleaning system having small jets of water that spray onto the table. The Jeter table has the disadvantage of spraying the table surface itself, which is also where an animal would rest during a procedure. Thus, the jets of water could not be used until after the procedure. This is not an improvement relative to the currently used treatment tables such as the VSSI, Inc. tables.

What is desirable for treating animals in a veterinarian office environment is a table that can allow an animal from small (5–10 lbs or smaller) to large (from 10–80 lbs or greater) size to rest or sit upon a surface that will allow liquids and other small debris to fall away from the animal and be washed away continuously. This would create a hygienic environment for the animal and practitioner. This type of table would also make the transition from treating one animal to another simpler and faster, thus more economical. The present invention is directed towards such a treatment table.

SUMMARY OF THE INVENTION

One object of the present invention is to provide a veterinarian treatment table for primarily non-sterile procedures.

Another object of the present invention is to provide a treatment table that continuously washes away debris and fluids from animals, wherein the practitioner is not required to clean after each procedure.

Yet another object of the present invention is to provide a treatment table that provides a clean area for an animal to rest while having a procedure performed upon it.

It is yet another object of the present invention to provide an economical and simple way to improve the transition time between treating one animal to another while maintaining a clean, hygienic environment.

These and other objects are achieved by providing a veterinarian treatment table having a sturdy base upon which an elongated tub rests. The base and tub are designed to support at least a 100 lb animal. The tub has an inclined bottom wall to drain fluids towards a drain at the bottom of the tub. Also provided is a fluid dispersing means which, in one embodiment, is a spray bar having a plurality of openings to allow fluid such as water to flow onto the tub bottom. A fluid sheeting element is also provided to form a uniform sheet of fluid to flow down the walls of the tub, thus creating a hygienic environment for the animal.

The tub is fitted with a grate that will support an animal and allow fluids to flow freely from the animal to the tub interior space and bottom wall. The uniform sheet of fluid from the fluid dispersing means continuously washes fluids from the animal away and into a drain. The water flow can be adjusted by a valve controlled by the veterinarian practitioner.

Additional objects, features and advantages will be apparent in the written description which follows.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE INVENTION

Figure 1:
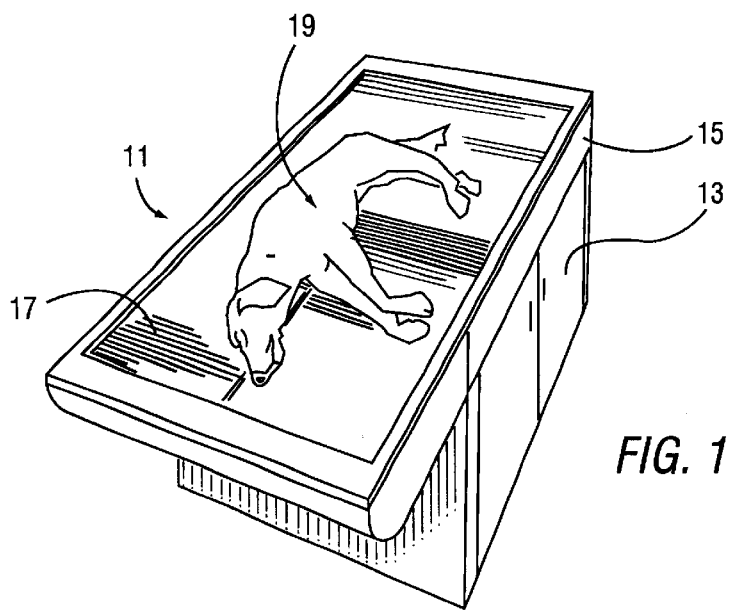
FIG. 1 is a perspective view of the veterinarian treatment table with an animal resting on the grate.

The present invention is primarily directed towards a veterinary treatment table. The table is built of a material and of a design such that it can hold the weight of a small to moderately sized animal such as a cat (10–15 lbs) or dog (10–80 lbs) or heavier animal up to 100 to 150 lbs. Further, the design is such as to allow the veterinarian practitioner to perform procedures upon the animal that may result in liquid material dropping from the animal and thus needing to be collected and carried away from the animal. Preferably, the table is made from 16 gauge stainless steel, but other rigid materials or combinations of materials may be used.

Often, animals must be treated or cared for where a clean but non-sterile environment is required. Procedures such bathing, cutting and trimming of hair and nails, dental work, shots or suture a wound all require a clean surface, but not necessarily a sterile surface. These procedures also often result in fluids or other materials (e.g., hair) falling from the animal. The treatment table of the present invention is able to hold an animal and provide a clean environment to perform non-sterile procedures on the animal.

The treatment table comprises a base and an elongated tub supported by the base. The base may have cabinets or shelves to store materials the practitioner may need for various procedures. The tub has a bottom wall and upstanding sidewalls which together define an interior space and an open top. The bottom wall is arranged at an incline with respect to the sidewalls, the sidewalls typically being horizontal relative to the surface upon which the base rests. A grate normally covers the open top, whereby liquid passing through the grate is received and contained within the interior space. The animal to be received by the practitioner is typically placed directly upon the grate. Thus, the grate is made from a material and design such as to support the animal's weight, the grate supported around its edges on the top edge of the tub.

The treatment table also has a fluid dispersing means, in one embodiment comprising a spray bar located on one sidewall in one embodiment and two or three sidewalls in another embodiment. The spray bar has a plurality of openings in a row located above a fluid sheeting element coupled to the spray bar. This arrangement creates a sheet of water on the bottom surface of the tub, wherein the water enters the spray bar, is first dispersed throughout the spray bar interior and passing through the plurality of openings, and then further dispersed by dropping onto the sheeting element before finally dropping onto a spillway and bottom. The spray bar is connected to a source of fluid such as tap water that can run continuously if desired, the flow controlled by a ball valve or other liquid valve system common in the art.

The fluid provided by the spray bar falls onto the fluid sheeting element and then onto the bottom wall to create a substantially uniform sheet of water along the bottom wall that flows down the incline of the bottom wall in order to wash the bottom wall and sidewalls during treatment procedures. The bottom wall incline is typically between about 3° and 15° relative to the sidewalls and/or the surface upon which the base rests. A fluid drain is typically located at the lowest point of the incline of the bottom wall to collect the material and liquid washed from the bottom wall.

The veterinarian treatment table is described in further detail with reference to the figures, and in particular with reference first to FIG. 1. One embodiment of the treatment table 11 is shown in FIG. 1, the table having a base 13 and elongated tub 15. An animal 19 rests upon a grate 17 seated on the open top of the table 11. The grating is typically a series of parallel, rigid bars secured to at least one longer, perpendicular rigid rod, but can take many forms. The grating allows fluids to flow freely through to the tub 15 below, thus keeping the surface the animal rests upon free of fluids.

Figure 2:
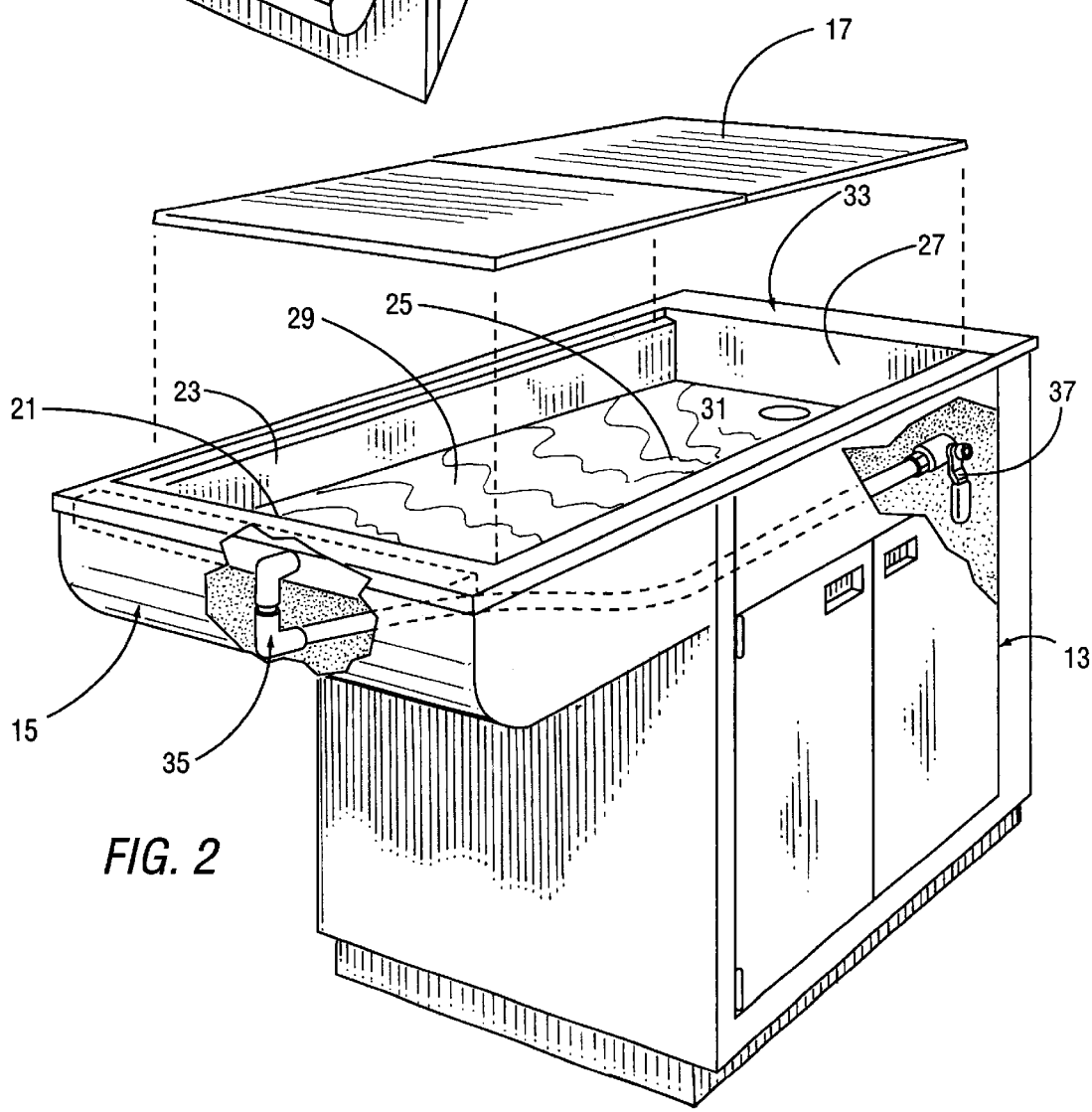
FIG. 2 is a closer perspective view of the treatment table with the grate lifted off.

The treatment table 11 is shown in greater detail in FIG. 2, wherein tub 15 comprises front sidewall 21, lateral sidewalls 23 and 25, rear sidewall 27, and bottom wall 29. The bottom wall 29 is inclined relative to the surface that base 13 rests upon, and relative to the grate 17. Thus, while the grate 17 is typically parallel with the surface that the table rests upon (e.g., a hard floor) the bottom wall is inclined in one direction. This allows an animal to rest upon a flat surface, while liquids from the animal will flow away from the animal to a drain. The sidewalls and bottom form an interior space 31 having an open top 33. The grating rests along its edges on the open top 33 edge, and fluids from animals can thus flow freely down to the interior space 31 and the bottom wall 29.

Fluid from the animals that falls into the interior space 31 and onto the walls and bottom is washed away by water falling onto the bottom and/or walls coming from the piping 35. The piping 35 supplies water to a spray bar within the tub that is described further below. The flow of water through the piping is controlled by ball valve 37 where fluid flow can be controlled or completely halted. The valve 37 is typically located on the outside surface of the tub 15 or base 13 so that the user may easily manipulate the flow of water.

The spray bar of the invention is described in greater detail with reference to FIG. 3, wherein one embodiment of the spray bar is shown. Spray bar 41 in the present embodiment is a box-shaped (in cross-section) cylinder located beneath front cover 53. One wall of the box has a plurality of spray openings 47 for allowing water to flow there through. The fluid piping 35 is coupled to the spray bar 41 in such a manner as to allow fluid to flow from a water source, through the piping 35, and into the spray bar 41 wherein the fluid, typically tap water, is dispersed within the spray bar 41. The piping 35 is ultimately coupled to a fluid source such as a sink or primary water line within a building.

Water flowing from the spray openings 47 falls onto a fluid sheeting element 51. The fluid sheeting element in the present embodiment is a rigid bar that protrudes down from the front sidewall 21 at an angle. The angle of protrusion is such that the element 51 is located at least partially beneath the plurality of spray openings 47. Hence, water flowing, in the present embodiment by force of gravity, from the openings 47 will fall onto the sheeting element 51. The water that falls onto the sheeting element 51 is then dispersed into a sheet of water 49 as it falls from the bottom edge of the sheeting element 51 onto the spillway bar 43 and/or the spillway 39. Liquid is then further dispersed into a sheet on the bar 43 and spillway 39, thus creating a sheet of water that flows down the bottom wall 29.

Figure 3:
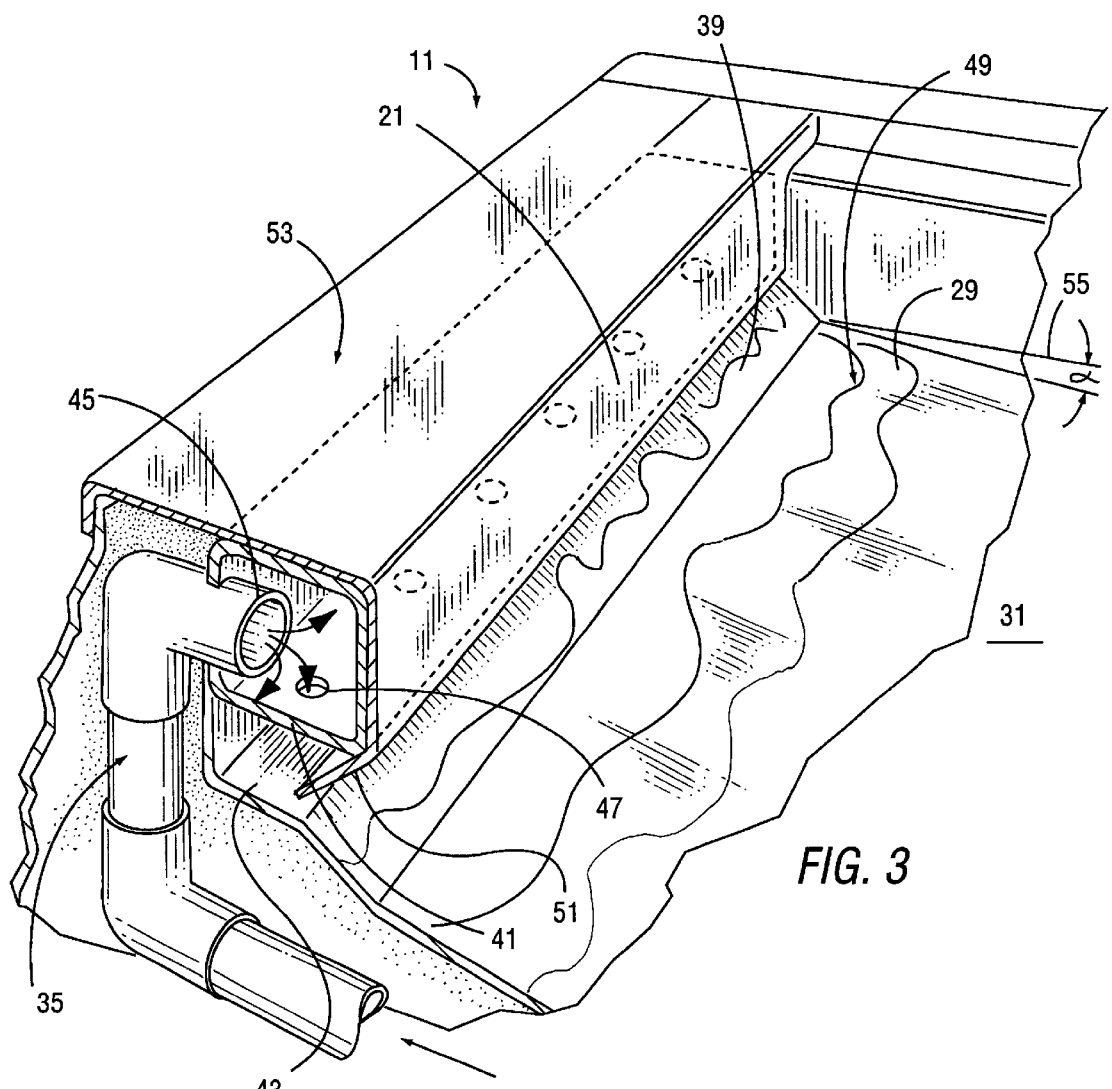
FIG. 3 is a cutaway view of the fluid dispersing means of the invention.
Figure 4:
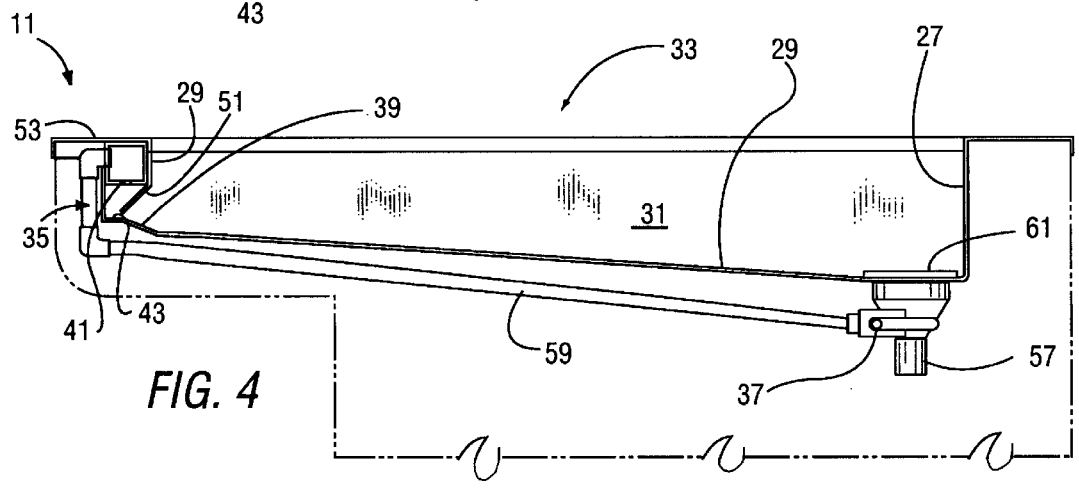
FIG. 4 is a cutaway side view of the treatment table.

The bottom wall 29 is shown in FIG. 3 being at an angle α relative to the horizontal axis 55. The angle α is typically between about 3° and 15°. The slope created in the bottom wall 29 allows water to flow downward across the bottom wall to wash away any debris, liquid, etc. that has fallen from the animal resting on grate 17. The water flows preferably across the entire surface of bottom 29 towards the rear sidewall 27 and into a drain, as shown with reference to FIG. 4. The drain top 61 is located flush with the bottom wall 29 surface so that fluid can completely drain out of the tub 15 and out through the drain bottom 57 to a waste receptacle. Also shown in FIG. 4 is piping 59 which, in the present embodiment of the table 11, carries water from the water source to piping 35 and into the spray bar 41.

The spray bar 41 can take on any number of configurations and have any number of spray openings. The spray bar can be circular or rectangular or oval, or any other suitable cross-sectioned shape. Preferably, the spray bar 41 has a length equal to the sidewall on which it is attached, especially the front sidewall. In other embodiments, it may be useful to have a spray bar the length of the front sidewall, and another spray bar the partial length of a lateral sidewall. The position of the spray openings 47 should be such that water can easily pass from the spray bar interior through the holes. Further, the size of the openings 47 should allow enough fluid to build up within the spray bar so that fluid will disperse throughout the length of the spray bar and thus uniformly fall from each spray opening 47. The fluid piping 35 coupled to the spray bar 41 may be designed such that the fluid delivered is under pressure, thus forcing water through the openings 47 onto the element 51.

The sheeting element 51 forms a part of a fluid dispersing means comprising the sheeting element and the spray bar 41 having the plurality of spray openings. The fluid dispersing means of the invention allows the formation of a sheet of water to advantageously flow down the bottom wall to continuously clean the surface and thus remove material that drips from the grate above. The fluid dispersing means can take any other form, and the description above is be no means meant to be limiting of the invention. For instance the water dispersing means may piping having a plurality of directional spray nozzles to direct a spray of water towards the bottom wall 29 and/or lateral sidewalls.

Figure 5:
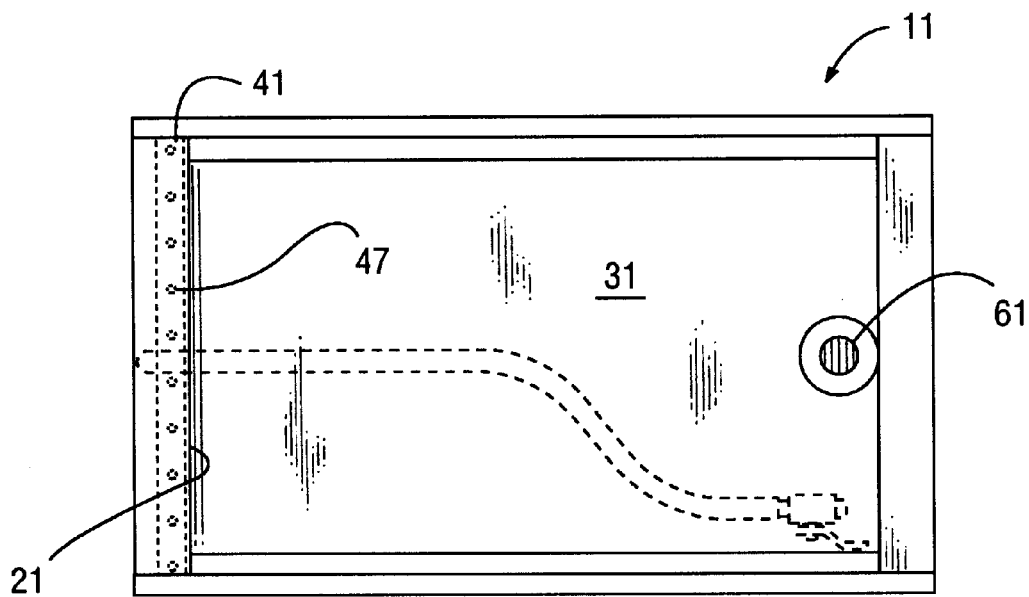
FIG. 5 is a top view of one embodiment of the treatment table, the dashed lines showing the fluid dispersing means.

The spray bar 41 having a plurality of spray openings 47 is shown in FIG. 5, wherein only the front sidewall 21 portion of the elongated tub 15 has a spray bar. Another embodiment of the present invention is shown with reference to FIG. 6, wherein a spray bar 103 is coupled to spray bar 105 and spray bar 107, each at 90° to one another around the front and lateral sidewalls of the tub 101. Each spray bar has a plurality of spray openings to allow liquid to flow there through. The fluid source is routed in a similar manner as the first embodiment, wherein piping 113 directs liquid such as water into one of the spray bars, in this case 103, and is thus dispersed within the spray bars 103, 105 and 107. The fluid then falls through the spray openings and onto sheeting elements similar to that shown and described with reference to FIG. 3. The water is then further dispersed before falling onto a spray bar and/or spillway as previously described. Referring back to FIG. 6, the sheet of water thus created flows down the bottom wall 111 towards drain 109 in tub 101.

Figure 6:
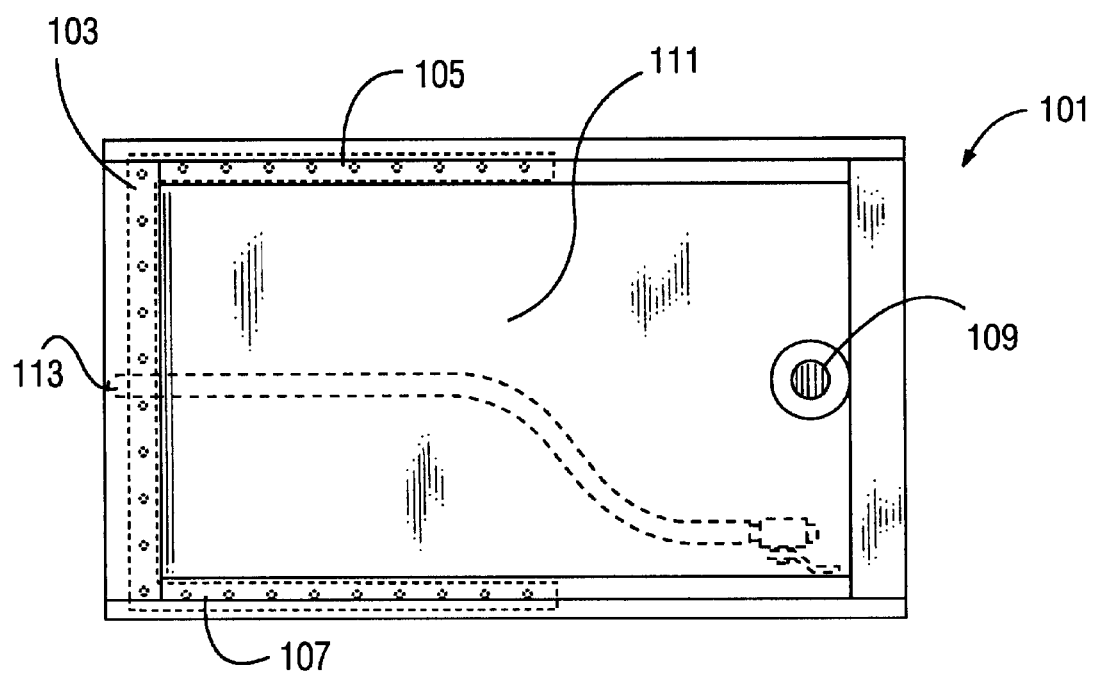
FIG. 6 is a top view of another embodiment of the treatment table, the dashed lines showing the fluid dispersing means.

In both embodiments shown in FIGS. 5 and 6, the water source is typically tap water coupled either to a sink or to an independent water line. Ball valve 37 can be used to adust the water pressure and flow rate, and can be used to turn the water off after a procedure performed by a veterinarian or other practitioner. Preferably, water will flow continuously during a procedure to wash away any fluids that fall into the tub of the invention. Further, the grate can be removed if cleaning of the inside of the tube is required.

The formation of a sheet of water from the sheeting element and spray bar is advantageous in that it completely clears the bottom wall of the tub in a continuous manner and allows the practitioner to perform multiple procedures without stopping to clean the tub. Further, noxious smells or substances are continuously moved away by the sheeting action of the water created by the invention.

While the invention has been described and illustrated with reference to certain particular embodiments thereof, those skilled in the art will appreciate that various changes, modifications and substitutions can be made therein without departing from the spirit and scope of the invention.

What is claimed is:

1. A veterinary treatment table, comprising:

a base;

an elongated tub supported by the base, the tub having a bottom wall and upstanding sidewalls which together define an interior space and an open top, the bottom wall being arranged at an incline with respect to the sidewalls;

a grate normally covering the open top, whereby liquid passing through the grate is received and contained within the interior space; and further comprising a spray bar located on at least one sidewall, the spray bar being connected to a source of fluid for washing the bottom wall and sidewalls during treatment procedures.

2. The treatment table of claim 1, wherein the table is made from 16 gauge stainless steel.

3. The treatment table of claim 1, wherein a fluid sheeting element is located beneath the spray bar to form a sheet of fluid as it falls from the spray bar onto a spillway.

4. The treatment table of claim 3, wherein the spray bar has a plurality of spray openings located in a row above the fluid sheeting element.

5. The treatment table of claim 1, wherein the water flowing from the spray bar forms a substantially uniform sheet of water upon the bottom wall.

6. The treatment table of claim 1, wherein the bottom wall incline is between about 3° and 15°.

7. The treatment table of claim 1, wherein a spray bar is located along a partial length of at least one lateral sidewall.

8. The treatment table of claim 1, wherein a drain is located at the lowest point of the incline of the bottom wall.

9. A veterinary treatment table, comprising:

a base;

an elongated tub supported by the base, the tub having a bottom wall and upstanding sidewalls which together define an interior space and an open top, the bottom wall being arranged at an incline with respect to the sidewalls;

a grate normally covering the open top, whereby liquid passing through the grate is received and contained within the interior space;

further comprising a spray bar located on at least one sidewall, the spray bar having a plurality of openings in a row located above a fluid sheeting element coupled to the spray bar, the spray bar being connected to a source of fluid; and wherein fluid provided by the spray bar falls onto the fluid sheeting element and then onto the bottom wall to create a substantially uniform sheet of water along the bottom wall that flows down the incline in order to wash the bottom wall and sidewalls during treatment procedures.

10. The treatment table of claim 9, wherein the bottom wall incline is between about 3° and 15°.

11. The treatment table of claim 9, wherein a spray bar is located along a partial length of at least one lateral sidewall.

12. The treatment table of claim 9, wherein the spray bar has a plurality of spray openings located in a row above the fluid sheeting element.

13. The treatment table of claim 9, wherein a drain is located at the lowest point of the incline of the bottom wall.

14. The treatment table of claim 9, wherein the table is made from 16 gauge stainless steel.

15. A veterinary treatment table, comprising:
- a base;
- an elongated tub supported by the base, the tub having a bottom wall and upstanding sidewalls which together define an interior space and an open top, the bottom wall being arranged at an incline with respect to the sidewalls;
- a grate normally covering the open top, whereby liquid passing through the grate is received and contained within the interior space; and
- further comprising a fluid dispersing means being connected to a source of fluid for washing the bottom wall and sidewalls during treatment procedures.

16. The treatment table of claim 15, wherein the fluid dispersing means comprises a spray bar having a plurality of spray openings.

17. The treatment table of claim 15, wherein the fluid dispersing means also has a fluid sheeting element coupled to the spray bar such that the element is contacted by fluid flowing from the plurality of spray openings.

* * * * *